(12) United States Patent
Dumora et al.

(10) Patent No.: US 9,193,069 B2
(45) Date of Patent: Nov. 24, 2015

(54) CONTROL METHOD FOR CONTROLLING A ROBOT AND CONTROL SYSTEM EMPLOYING SUCH A METHOD

(71) Applicant: COMMISSARIAT A L'ENERGIE ATOMIQUE ET AUX ENERGIES ALTERNATIVES, Paris (FR)

(72) Inventors: Julie Dumora, Paris (FR); Franck Geffard, Orsay (FR); Xavier Lamy, Issy-les-Moulineaux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/363,771

(22) PCT Filed: Dec. 7, 2012

(86) PCT No.: PCT/EP2012/074868
§ 371 (c)(1),
(2) Date: Jun. 6, 2014

(87) PCT Pub. No.: WO2013/083818
PCT Pub. Date: Jun. 13, 2013

(65) Prior Publication Data
US 2014/0324219 A1 Oct. 30, 2014

(30) Foreign Application Priority Data
Dec. 9, 2011 (FR) ...................................... 11 61402

(51) Int. Cl.
*B25J 9/16* (2006.01)
*B25J 17/02* (2006.01)

(52) U.S. Cl.
CPC .............. *B25J 9/1633* (2013.01); *B25J 9/1679* (2013.01); *B25J 9/1687* (2013.01); *B25J 17/0208* (2013.01); *Y10S 901/09* (2013.01); *Y10S 901/46* (2013.01)

(58) Field of Classification Search
CPC ...... B25J 9/1633; B25J 9/1679; B25J 9/1687; B25J 13/00; B25J 13/006; B25J 13/065; B25J 13/085; B25J 15/008; B25J 15/0095; G01L 5/22; G01L 5/223; G01L 5/0028; G01L 5/0042
See application file for complete search history.

(56) References Cited

U.S. PATENT DOCUMENTS 5,101,472 A * 3/1992 Repperger .................... 700/261
6,612,449 B1 * 9/2003 Otani et al. .................... 212/317
(Continued)

FOREIGN PATENT DOCUMENTS

JP 6246652 A 9/1994
JP 2000176872 A 6/2000
(Continued)

*Primary Examiner* — Nicholas Kiswanto
(74) *Attorney, Agent, or Firm* — Baker and Hostetler LLP

(57) ABSTRACT

A control method for the control of a robot by an operator, using control means which may be positioned at will at different locations of an item to be manipulated, comprises at least a step of determining the position and attitude of the control means on the basis of measurements of forces applied to the control means, defining a first force torsor, and on the basis of corresponding forces, at the gripping member of the robot for example, a step of determining force or force/position control setpoints for the robot on the basis of, at least, measurements of forces on the control means applied to move the item, and of the position and attitude determined during the determination step, and a control step in which the determined setpoints are sent to the robot. A control system employing such a method is also provided.

17 Claims, 3 Drawing Sheets

(56) References Cited

U.S. PATENT DOCUMENTS

| | | | |
|---|---|---|---|
| 7,953,509 B2 * | 5/2011 | Murayama | 700/114 |
| 2009/0212478 A1 * | 8/2009 | Murayama | 269/56 |
| 2009/0259412 A1 * | 10/2009 | Brogardh | 702/41 |
| 2010/0087955 A1 | 4/2010 | Tsusaka et al. | |
| 2014/0343729 A1 * | 11/2014 | Fudaba et al. | 700/261 |
| 2015/0051732 A1 * | 2/2015 | Grygorowicz et al. | 700/257 |

FOREIGN PATENT DOCUMENTS

| | | |
|---|---|---|
| JP | 200534960 A | 2/2005 |
| JP | 200775974 A | 3/2007 |
| JP | 2008213119 A | 9/2008 |

* cited by examiner

CONTROL METHOD FOR CONTROLLING A ROBOT AND CONTROL SYSTEM EMPLOYING SUCH A METHOD

CROSS-REFERENCE TO RELATED APPLICATIONS

This application is a National Stage of International patent application PCT/EP2012/074868, filed on Dec. 7, 2012, which claims priority to foreign French patent application No. FR 1161402, filed on Dec. 9, 2011, the disclosures of which are incorporated by reference in their entirety.

FIELD OF THE INVENTION

The present invention relates to a control method for controlling a robot and a control system employing such a method. According to the present invention, the robot is controlled by a human operator, using control means. The present invention is applicable, notably, to the control of industrial robots used for moving and positioning heavy and bulky loads.

BACKGROUND

Industrial robots can be used to move an object in space according to a certain number of degrees of freedom of the latter. These robots are used for moving items which are typically too heavy or too bulky to be moved by a human operator, on production lines for example. These robots can also provide precise positioning of these items, for the purpose of assembly operations, for example. Not all the tasks performed by industrial robots can be entirely automated, and some of them must therefore be controlled by a human operator. Typically, an industrial robot is a system comprising a plurality of joints, made after the pattern of a human arm. It may take the form of a manipulator arm, fitted at one end with a gripping member adapted to grasp the item. The item may be oriented spatially by the robot, for example by rotation about three axes, and by translation along the said three axes; in all cases, the combined movements of the components of the robot must allow the item to be manipulated so as to be moved and oriented in space.

There are various systems for controlling these robots. In a first technique, commonly called "remote operation", an operator is able to control the robot at a distance, by means of an interaction referred to as indirect. Typically, the robot may be controlled by means of a control device which conventionally takes the form of a control box having a plurality of push buttons for initiating various movement actions. The control box can then be used to move the gripping member of the robot, pressure on a button being, for example, associated with a movement according to one of the six degrees of freedom, in a given direction.

A drawback of this technique is that a control box does not allow the operator to sense the forces applied by the robot and the environment to the manipulated item, although this data feedback may be essential for the correct performance of certain tasks such as assembly tasks.

A further drawback of this technique is that it allows the movement of the item to be controlled only within frames of reference associated with the robot, or more precisely with the robot's gripping member, or with one of the articulations of the manipulator arm, for example. However, the operator is concerned with the manipulation of the item itself, rather than with the control of the robot as such: he may therefore prefer to be able to control the movement of the item in different frames of reference, such as those associated with the item. Thus a remote operation technique may be useful for placing the robot in a particular configuration in space, but it is less suitable for the precise manipulation of an item, the required degree of precision being, for example, greater when it is necessary for the item to be in contact with its environment.

An alternative known technique, commonly referred to as "computer-assisted remote operation with force feedback" can partially overcome the aforesaid drawbacks. According to this technique, the control device is not made in the form of a box fitted with buttons, but rather in the form of a member which may be called a "master arm", for example a control lever, or "joystick" as it is called in English, which can be moved in space by the operator, and causes the movement of the robot, which is then called a "slave". The control lever may be provided with movements controlled by a dedicated controller, allowing the provision of a force feedback perceptible to the user. One advantage of this technique is that it allows more intuitive control of the robot. Furthermore, the fact that this technique allows the operator to sense the forces applied to the robot helps to provide more precise assistance to the latter, notably during the performance of tasks in which the manipulated item comes into contact with external elements. According to this technique, the operator is able to choose frames of reference in which the robot is to be controlled to perform specific tasks; indeed, the operator may even be able to specify the tasks to be performed by the robot.

A drawback of this technique is that it requires the operator to specify the frames of reference or the tasks, for example if he wishes to manipulate the item in frames of reference other than those of the robot, which may prove to be difficult and, in particular, impractical during the manipulation of an item.

A further drawback of the two aforesaid techniques relates to the operator's viewpoint of the scene, in that the operator has to remain at a specific location, and is not free to choose his viewpoint of the scene, unless he uses video camera systems, for example; that is to say, unless he accepts additional constraints in terms of the number of sensors used, as well as constraints relating to the positioning of these sensors, notably for the purpose of avoiding possible obscuration.

It may thus be preferable for the operator to remain in the proximity of the scene. There are known control systems by means of which the operator can interact directly with the robot, for example by using a control handle fixed to the gripping member of the robot, and enabling the operator to cause the movement of this member. In this way, the item can be manipulated with its six degrees of freedom, with the provision of exact compensation for the weight of the item. However, more especially if the operator has to manipulate a large item in a precise manner, he may find it difficult to control the robot simply by means of a control handle fixed to one end of the robot's arm. It may be essential for the operator to grasp a particular location on the item in order to manipulate it in a certain way; moreover, the handle fixed on the robot may move out of the operator's reach when the robot has to grasp a large item on its own.

In order to overcome these drawbacks, control systems have been designed which enable an operator to interact with an item to be manipulated by means of the item itself, by using a control member, separate from the robot and allowing direct interaction with the item, located at one end of the item. A control system of this type is described in the Japanese patent application published under the reference JP 2008/213119. In this control system, a handle separate from the robot may be positioned at a predetermined location on a frame supporting the item to be manipulated.

A drawback of this control system arises from the fact that the item can be controlled only in the frame of reference of the robot or of the handle, which is fixed with respect to the control system, making it necessary for the orientation and position of the frame of reference of the handle with respect to the robot to be predetermined and known during the implementation and adjustment of the robot control, and to remain fixed subsequently.

Furthermore, the grasping position may not always be suitable for the manipulation of the item: for example, if the item has to be turned over, the handle may be located under the item when the latter has been turned over, causing difficulties in manipulation. The grasping position may also prove to be unsuitable if, for example, the item has to be assembled with another item, as the handle may obstruct the assembly operation in some configurations.

A further drawback of systems in which the forces applied by the human operator are applied remotely from the robot is due to the fact that the forces applied by the operator at the point where he grasps the item are different from the forces experienced by the gripping member of the robot, possibly giving rise to ambiguities between different movements, for example rotational and translational movements. For example, in a configuration in which the operator and the gripping member of the robot grasp each end of an item, for example a plank, the force experienced by the gripping member of the robot resembles a torque, regardless of whether the operator wishes to make the item pivot about the robot's effector or to translate it.

SUMMARY OF THE INVENTION

One object of the present invention is at least to mitigate the aforesaid drawbacks, by proposing a control method and system for a robot enabling an operator to manipulate an item in an intuitive and precise manner, according to the six degrees of freedom of the item, by a direct physical interaction with the item, while the operator remains capable of manipulating the item easily, regardless of its configuration.

An advantage of the invention is that a control method or system according to one of the described embodiments enables the force or force/position control of the robot to be adapted according to its environment and the control by the operator, the latter being free to choose the frame of reference of manipulation in real time, in an intuitive manner, and being able to interact physically with the item, the robot and the environment at the same time.

A further advantage of the invention is that a control method or system according to one of the described embodiments allows simple manipulation which requires no operator training.

A further advantage of the invention is that a control method or system according to one of the described embodiments may be developed from an existing robot control system, by the addition of a small number of inexpensive, compact devices.

A further advantage of the invention is that a control method or system according to one of the described embodiments makes it possible to resolve possible ambiguities between translational and rotational movements.

A further advantage of the invention is that a control method or system according to one of the described embodiments makes it possible to use virtual guides determined as a function of the forces applied by the operator on the control means and the position of these control means, thus providing additional assistance to the operator.

A further advantage of the invention is that a control method or system according to one of the described embodiments is robust against possible obscuration and against possible variations in illumination, and requires no preliminary positioning of sensors. Obscuration and variations of illumination may, notably, adversely affect the operation of control systems using handle location means based on optical sensors such as cameras, or on acoustic sensors, the latter being, for example, equally sensitive to obscuration. A control system according to one of the described embodiments is also robust against parasitic magnetic fields and objects with high magnetic permeability present in the environment, and may adversely affect the operation of the control systems using handle location means based on magnetic field sensors.

A control system according to one of the described embodiments is also robust against walls which are present in the environment, and which may adversely affect the operation of control systems using radio frequency handle location means, which are affected by the "multipath" problem due to the multiple paths of reflected radio waves.

A control system according to one of the described embodiments is also robust against the drift of the position and orientation to be determined that may occur in control systems using handle location means based on inertial sensors and the integration of their measurements.

For this purpose, the invention proposes, in a first embodiment, a control method for a robot comprising at least one articulation and at least one gripping member adapted to move an item in space, the robot being controlled by control means, the method comprising a concatenation of at least the following steps:

a step of positioning control means on the item, a step of determining the position and attitude of the control means on the basis of measurements of forces applied to the control means, defining a first force torsor, and corresponding forces at the gripping member of the robot, defining a second force torsor, a step of determining force or force/position control setpoints on the basis of measurements of forces on the control means applied to move the item, and of the position and attitude determined during the determination step, a control step in which the determined setpoints are sent to the robot.

In a second embodiment of the invention, the position and attitude of the control means can be determined by minimizing the error between the measurement of one of two torsors chosen from said first force torsor and said second force torsor, and the measurement of the same torsor reconstructed from the measurement of the other of these two torsors, using Varignon's relation.

In a third embodiment of the invention, the position and attitude of the control means can be determined by on-line processing of the force torsors obtained from the force measurements, using a recursive algorithm.

In a fourth embodiment of the invention, said recursive algorithm may be an unscented Kalman filter.

In a fifth embodiment of the invention, the position and attitude of the control means can be determined by off-line processing of the force torsors obtained from the force measurements, based on a recording of the corresponding data over a specified period, using an optimization algorithm.

In a sixth embodiment of the invention, said optimization algorithm may be based on the Nelder-Mead method.

In a seventh embodiment of the invention, the control method may further comprise a step of checking the fixing of the control means to the items, which is performed after the positioning step.

In an eighth embodiment of the invention, the control method may further comprise a location checking step in which the consistency of the determined position and attitude of the control means is determined by comparing a confidence level, associated with the estimated values determined by the recursive algorithm, with a predetermined level.

In a ninth embodiment of the invention, the control method may further comprise a location checking step in which the consistency of the determined position and attitude of the control means is determined by comparing a confidence level, associated with the estimated values determined by the off-line processing, with a predetermined level.

In a tenth embodiment of the invention, the control method may further comprise a location checking step in which the consistency of the determined position and attitude of the control means is determined by comparing the position and attitude determined in the determination step of the control means with a position and attitude of the control means determined according to an estimation or identification algorithm on the basis of at least measurements of acceleration and orientation or angular velocity of the control means (100) made by means of appropriate sensors.

In an eleventh embodiment of the invention, the step of setpoint determination may be replaced by a substitute determination step in which the control setpoints of the robot are determined solely on the basis of the force and/or position measurements made at the gripping member of the robot, or at said at least one articulation of the robot, if the fixing of the control means to the item is inappropriate.

In a twelfth embodiment of the invention, the step of setpoint determination may be replaced by a substitute determination step in which the control setpoints of the robot are determined solely on the basis of the force and/or position measurements made at the gripping member of the robot, if the determined position or attitude of the control means is inconsistent.

The present invention also proposes a control system for a robot comprising at least one articulation and a gripping member adapted to move an item in space, the control system comprising:
- means for measuring forces applied at the gripping member of the robot,
- control means adapted to be fixed to the item and comprising means for measuring forces applied to the control means,
- collection means configured to collect the force measurements made by the means for measuring forces applied at the gripping member of the robot and to the control means,
- a controller configured to employ the collection means,
- the controller being further configured to employ a control method according to the aforementioned first embodiment.

In one embodiment of the invention, the control means may comprise reversible fixing means.

In one embodiment of the invention, the control system may further comprise means of monitoring the control means, configured to detect the detachment of the control means from the item, the controller being configured to employ a control method according to the aforementioned seventh embodiment.

In one embodiment of the invention, the control means may be formed by at least one handle comprising a support and a handgrip, the support being designed to be fixed to the item by the fixing means.

In one embodiment of the invention, the control means may be formed by at least one glove.

The present invention proposes to determine the torsor of forces applied by the operator to the control means in a frame of reference associated with the robot, for the purpose of controlling the latter. The control method or system according to the present invention also makes it possible to determine precisely the position and attitude of the control means, in the form of one or more handles for example, these data being used in order to exploit the force measurements of the control means for the purpose of determining the control setpoints of the robot. The handle or handles can thus be positioned as desired on the item to be manipulated, and can be fixed to it by suitable fixing means, these means being reversible, that is to say allowing an operator to remove the handle or handles easily from the item so that they can be positioned at another location on the item if required.

BRIEF DESCRIPTION OF THE DRAWINGS

Other characteristics and advantages of the invention will become clear in the light of the description provided by way of example, with reference to the attached drawings which represent.

DETAILED DESCRIPTION

Figure 1:
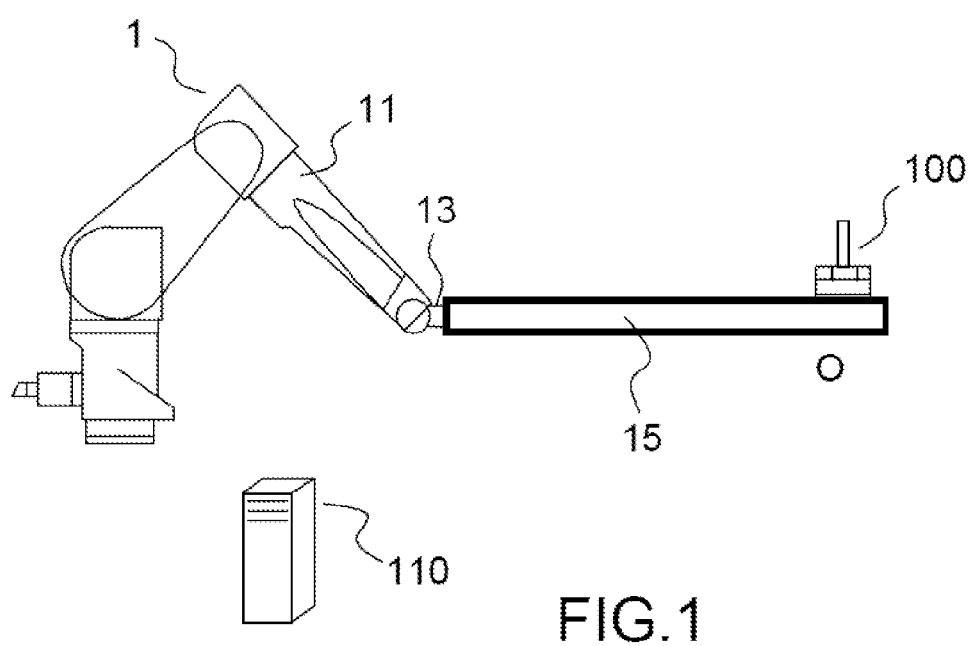
in FIG. 1, a profile view illustrating a control system according to an embodiment of the present invention.

FIG. 1 shows a robot 1, comprising for example a manipulator arm 11 at the end of which is placed a force sensor, not shown in the figure, operating for example with six axes of freedom, in which case the sensor is called a "six-axis sensor". A gripping member 13 is positioned in the terminal part of the manipulator arm 11. The gripping member 13 grasps an item 15 to be manipulated. Control means, formed by a handle 100 in the example illustrated in the figure, may be fixed to the item 15. The handle 100 can be grasped by an operator, not shown in the figure, and may be positioned at a desired location on the item 15 as the operator wishes.

An example of a structure of the handle 100 is described below with reference to FIG. 2. The handle 100 may notably comprise fixing means for fixing to the item, so that it is held in place despite the forces exerted on it during the manipulation of the item 15, that is to say during the control of the robot 1, and can easily be removed so as to be positioned at another location. Examples of fixing means are explained below with reference to FIG. 2.

In the example illustrated in the figure, the item 15 to be manipulated is essentially flat in shape, resembling a plank, but it is to be understood that the present invention can be used for the manipulation of different and even complex shapes.

When he has grasped the handle 100, the operator may, for example, use the handle 100 to impart displacement movements to the item 15 as if he were applying them directly to the item, the function of the robot typically being to eliminate the operator's perception of the weight of the item. The operator may position the handle 100 at the most advantageous location on the surface of the item 15 to be manipulated.

Each movement of the handle 100 may require a preliminary phase in which, for example, the operator has to exert forces in different directions. An off-line estimation or identification algorithm, for example, may then be used to determine the position and orientation of the handle 100, or of the plurality of handles. These principles are described in detail below with reference to FIG. 3.

A controller 110 can deliver control setpoints to the robot 1, and can employ control algorithms based on input data obtained, notably, from the sensors included in the control means and in the robot 1, as explained below. More generally, the controller 110 can employ a control method according to one of the embodiments of the invention.

A control system according to the present invention may also comprise means for collecting the data outlined above, obtained from the sensors, these collection means possibly being included in the controller 110, for example.

The control system may comprise different sensors adapted to collect measurements of the forces applied at the gripping member of the robot. These sensors are usually added to irreversible or low-reversibility robots which are widely represented in the range of industrial robots, and which are made to evolve and be in contact with their environment, including the operator.

It should be noted that the force sensor may, for example, be a multi-axis sensor located on the gripping member of the robot. It is also possible to position sensors, for example torque sensors, at the articulations of the robot; the measurements made by these sensors can then enable force measurements to be made at the gripping member of the robot. Force measurements may also be obtained from measurements of the current supplied to the motors of the robot's articulations.

According to a specific feature of the present invention, the control means, that is to say the handle 100 in the example illustrated in the figure, comprise means for making measurements of forces applied to the control means. Exemplary embodiments of a handle 100 provided with these means are described below with reference to FIG. 2.

Figure 2:
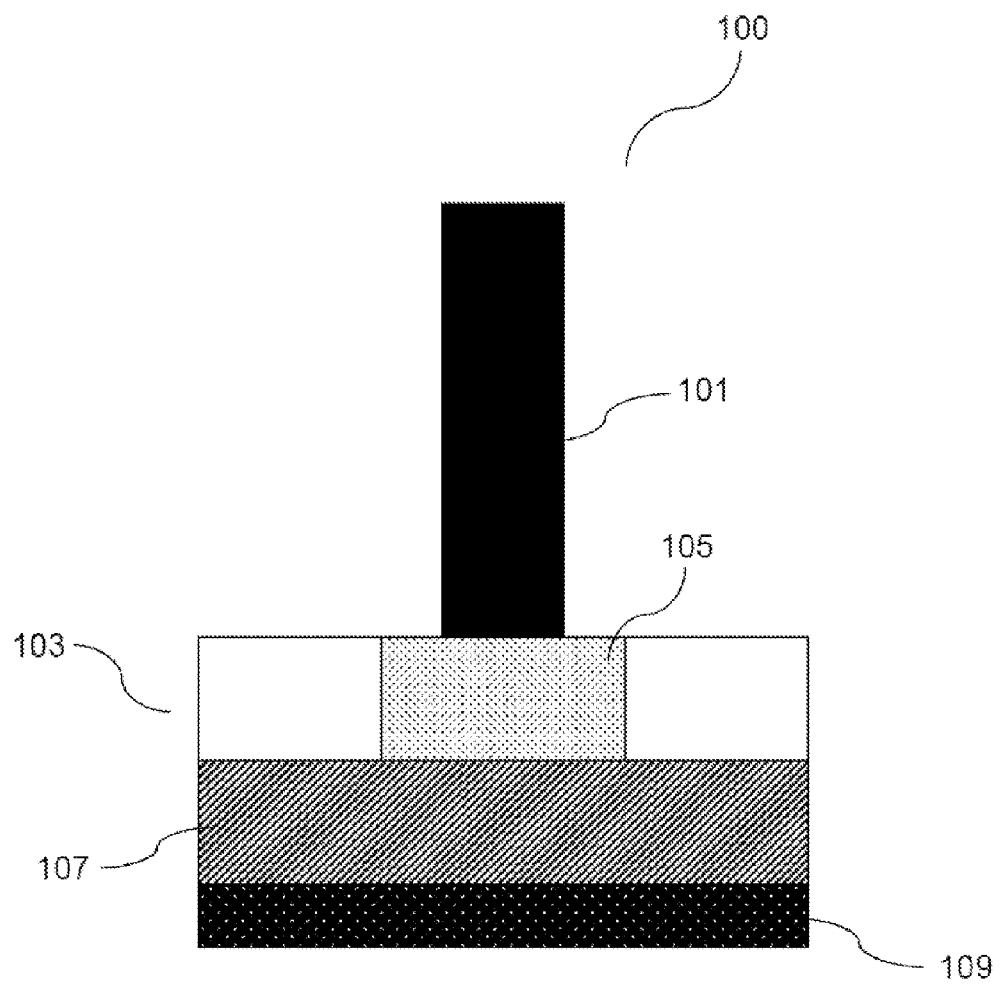
in FIG. 2, a sectional view illustrating in a synoptic way the structure of a handle forming a control means according to an embodiment of the invention.

With reference to FIG. 2, a handle 100 may comprise a graspable element 101 that can be grasped by an operator's hand, and a support 103. The handle 100 also comprises a force sensor 105 for capturing the forces along the six axes, and for returning force signals representative of these forces. The base of the support 103 may comprise fixing means 109.

The fixing means 109 must be such that the fixing of the handle 100 to the item to be manipulated is sufficiently robust to the movements imparted by the operator, while still allowing the operator to remove the handle 100 easily in order to position it, at his discretion, at another location on the item. The fixing means 109 can therefore be described as "reversible".

For example, the fixing means 109 may take the form of self-gripping strips, the surface of the item being possibly treated to allow the fixing of these strips.

If the item to be manipulated is made of a ferromagnetic material, the fixing means 109 may take the form of a permanent magnet or an electromagnet.

The fixing means 109 may also take the form of a suction pad, or a suction system operated by a pump.

The fixing means 109 may also take the form of an adhesive strip.

In the exemplary embodiment shown in FIG. 2, the force sensor 105 is positioned in the support 103 and is a six-axis force sensor.

Advantageously, the handle 100 may comprise additional measuring means 107.

The additional measuring means 107 may, for example, comprise at least a 3D accelerometer and/or one or more 3D rate gyroscopes. The additional measuring means 107 may, for example, take the form of an inertial guidance unit. At least one 3D accelerometer may, for example, be used to determine the acceleration due to the Earth's gravity when the handle is in a stationary position, as this information may improve the determination of the orientation of the handle. The additional measuring means 107 may also make it possible, with the aid of calculation means, for example those using a filter such as a Kalman filter, to estimate the position and attitude of the handle 100, for example in order to confirm the determination carried out by the estimation or identification algorithm described below, or in order to define an appropriate initialization point of the estimation or identification algorithm so that the latter converges more rapidly, as described in detail below.

In practice, the operator may grasp one handle or two handles such as the handle 100 by their graspable elements 101, and may position the handle or handles 100 wherever he wishes on the surface of the item to be manipulated. The force sensor 105 can then be used to measure the forces applied by the operator to the handles 100. A force torsor can then be determined, in the frame of reference of the handle 100. The force torsor may be determined in a dedicated calculation module, for example one implemented in the controller 110, described previously with reference to FIG. 1.

It is then necessary to know the position and the orientation, or attitude, of the handle 100 in order to make use of the aforesaid force torsor in the determination of the control setpoints of the robot.

According to a specific feature of the present invention, it is proposed to determine the position and attitude of the handle 100 on the basis of the relation between the reduced force torsors at the handle 100 and at the effector of the robot. This is because, according to the hypotheses of solid mechanics, the relation between the reduced force torsors at the handle 100 and at the effector of the robot depends solely on the relative position of their respective reduction centers and the respective orientations of their own frames of reference.

This relation, corresponding to Varignon's relation applied to the force torsors, can be formulated by means of the following relations:

$$^r m_r = ^r m_o + RP \times ^r f = ^r R_p{}^p m_p + RP \times (^r R_p{}^p f_p) = q^r m_p q^{-1} + RP \times (q^p f_p q^{-1})^r f_r = ^r f_p = ^r R_p{}^p f_p = q^p f_p q^{-1} \quad (1),$$

in which $^y X_z$ denotes a variable X expressed in a frame of reference y in a reduction point z, the force torsor being $$\begin{bmatrix} f \\ m \end{bmatrix},$$

where f is the force vector in three dimensions, and m is the moment vector in three dimensions, while r denotes the effector of the robot and p denotes the handle, RP denotes the vector describing the position of the handle relative to the effector of the robot in the frame of reference of the robot, R and q denote, respectively, the rotation matrix and the quaternion representing the orientation of the handle relative to the effector of the robot.

In the exemplary embodiment described above, the force torsor at the gripping member of the robot can be determined by means of the six-axis force sensor.

It is also possible to determine the force torsor at the handle 100, on the basis of the data collected by the force sensor 105, which can also be transmitted by appropriate means to the collecting means of the controller 110.

In the exemplary embodiment described above, the operator applies forces to the handle in given directions in a preliminary phase, to enable the position and attitude of the handle to be determined, as outlined above. The forces to be applied by the operator in the preliminary phase may, for example, be related to the forces that he would apply if he wanted to ensure that the handle was correctly fixed.

The controller 110 may also be configured to employ a control method for the robot as described below.

Figure 3:
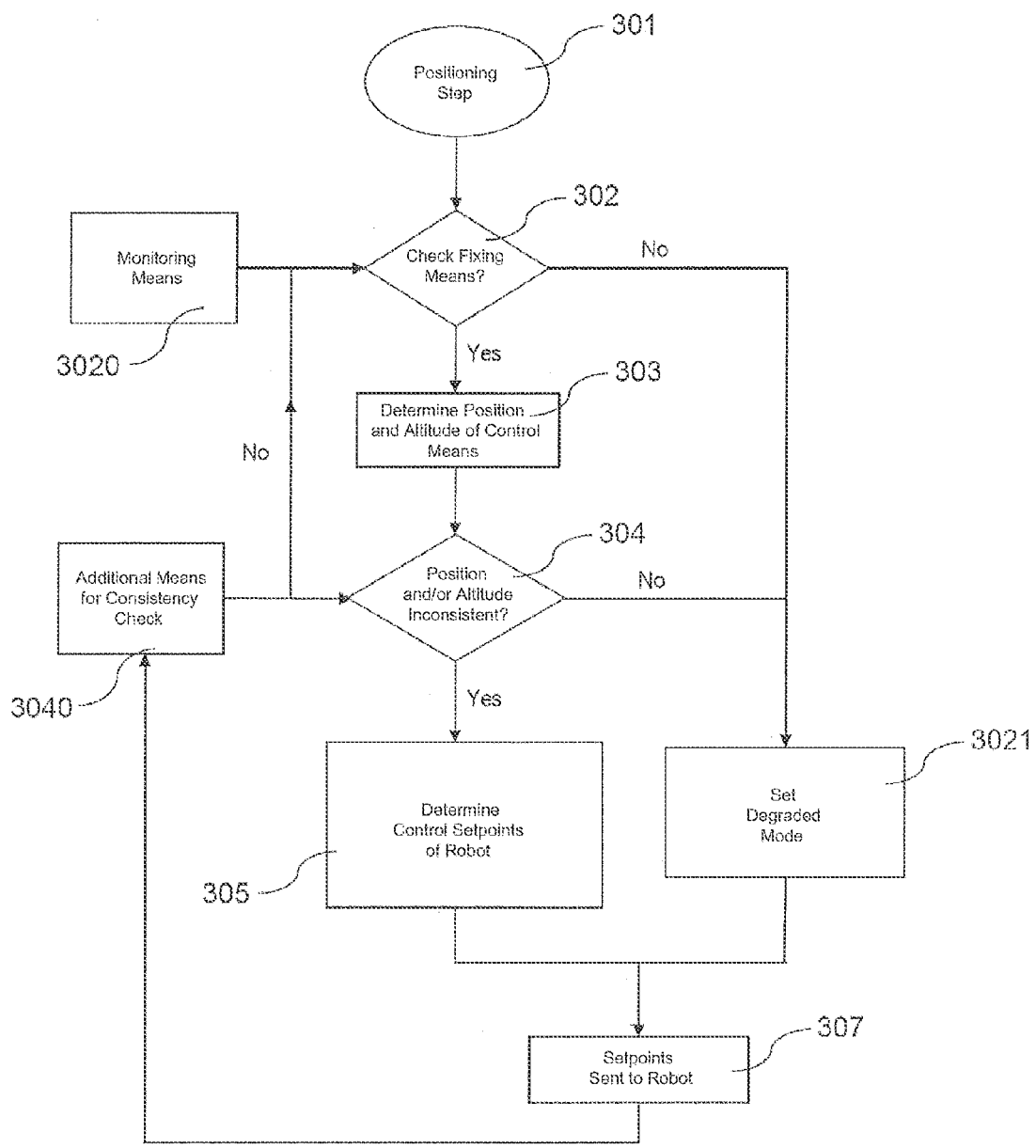
in FIG. 3, a flow chart showing a control method for a robot, according to one embodiment of the invention.

An example of a control method for the robot is described below with reference to FIG. 3.

In a positioning step 301, the human operator positions the handle at a given location on the item to be manipulated. The positioning step 301 may advantageously be followed by a step 302 of checking the fixing means, in which a check may be performed as to whether the handle is appropriately fixed. Monitoring means 3020 of the control means may deliver data representative of the correct fixing of the handle. Examples of monitoring means 3020 are described below. If it is found in the checking step 302 that the control means are not fixed appropriately, the control system may, for example, be put into what is known as "degraded" mode 3021, in which the control setpoints of the robot are determined solely on the basis of the data delivered by the sensors present on the robot. Alternatively, if it is found in the checking step 302 that the control means are not fixed appropriately, the control system may, for example, be put into a safe mode in which all the degrees of freedom of the robot are blocked.

The checking step 302, or the positioning step 301 if no checking step is provided, is followed by a step 303 in which the position and attitude of the control means are determined.

An estimation or identification algorithm may be employed during the determination step 303, enabling the position and orientation of the control means to be determined relative to the effector of the robot.

First of all, the position and orientation or attitude are initialized. The initial position and attitude may be chosen at will; for example, they may be chosen to be identical to the position and attitude of the effector of the robot when the control means are fixed for the first time to the item to be manipulated. Subsequently, whenever the control means are moved by the operator, the initialization can be carried out on the basis of the position and attitude of the control means estimated at the end of the preceding movement of these means.

Advantageously, the initialization can be carried out more finely, for example if additional means such as a 3D accelerometer or an inertial guidance unit in the control means are available. As described above, the initialization may, for example, be carried out on the basis of the previous knowledge of the acceleration due to the Earth's gravity if an accelerometer is available, and/or on the basis of an estimate of position and/or attitude obtained on the basis of the data of the inertial guidance unit and the use of an estimation filter, if these elements are available.

The estimation of the position and attitude of the control means requires a plurality of measurements of the forces applied at the control means, and of the corresponding forces applied at the effector of the robot. For this purpose, the operator applies various forces to the control means, for example forces similar to those which he would apply to these means to ensure that they were correctly fixed, as described above.

According to the hypotheses of solid mechanics, it is possible to use Varignon's relation, which can express the torsor applied at a point A of a solid at another point B of this solid solely by means of the position and orientation relating these two points, to the reduced torsors at the effector of the robot, in other words its gripping member, and at the control means.

According to the present invention, the position and attitude of the control means can be estimated by minimizing the error, or the square of the error:

between the measurement of one of two torsors chosen from a first torsor formed by the reduced force torsor at the control means and a second force torsor formed by the reduced force torsor at the gripping member of the robot, and the same torsor reconstructed from the measurement of the other of the aforesaid two torsors, using Varignon's relation.

The position and attitude between the control means and the effector of the robot are then determined when the error is minimal. The determined position and attitude correspond to the pair of their values yielding the smallest error.

In practice, the position and attitude of the control means can be estimated by on-line processing and exploitation of the data, using a recursive algorithm, in which the estimation of the current state vector requires a knowledge of the preceding state and the present measurements. For example, a Kalman filter may be used. More specifically, a Kalman filter of the unscented type, commonly referred to according to the English terminology as an "unscented Kalman filter" or by the corresponding abbreviation "UKF", may be used.

Alternatively, the position and attitude of the control means can be estimated by off-line processing of the data, by recording all the data over a specified period and then using an optimization algorithm, using the Nelder-Mead method for example.

These algorithms are mentioned by way of example, but it is to be understood that other estimation or identification algorithms may be used.

It should be noted that positions and attitudes of a plurality of devices are determined if the control means are formed by two handles or other devices described below.

When the position and attitude of the control means have been determined at the end of the determination step 303, a step 305 of determining the control setpoints of the robot can be performed. The positions and attitudes that are determined enable force or force/position control of the robot to be provided on the basis of, at least, measurements of forces at the control means.

Advantageously, a location checking step 304 may be performed after the determination step 303 and before the setpoint determination step 305. For example, if additional means 3040 such as a 3D accelerometer or an inertial guidance unit are included in the control means, a consistency check can be performed between the estimates provided by these additional means. If it is found in the checking step 304 that the determined position and/or attitude of the control means are inconsistent, the control system may, for example, be put into what is known as a "degraded" mode, and the position and attitude may then be determined in a substitute determination step 3021, in which the control setpoints of the robot are determined solely on the basis of the data delivered by the sensors present on the robot. Alternatively, if it is found in the location checking step 304 that the determined position and attitude of the control means are inconsistent, the control system may, for example, be put into a safe mode in which all the degrees of freedom are blocked, or in which only the degrees of freedom corresponding to those for which the additional means allow the diagnosis of an inconsistency are blocked. It is possible to proceed in a parallel way with the determination of the position and attitude of the handle, according to the determination step 303, until the position and attitude are considered to be consistent. It is also possible for the fixing means to be checked in advance according to the checking step 302.

If these additional means are not used, a consistency check may also be performed in the location checking step 304, by an assessment of the confidence level associated with the estimated values. If this confidence level is beyond a specified threshold, the control system may be put into the degraded mode or into a safe mode in which all the degrees of freedom of the robot are blocked.

The setpoint determination step 305 is followed by a control step 307 in which the setpoints are sent to the robot.

To summarize, as soon as the location of the control means is consistent, the forces applied to the control means are determined, and the robot is controlled at least on the basis of these forces. All these steps form a loop and are repeated, for example, until it is detected that the control means are no longer fixed, or that the location is no longer considered to be consistent, if means are provided for this purpose. The method can then be resumed according to the flow chart shown in FIG. 3.

Advantageously, it is possible to determine the position and attitude of the control means by applying the aforesaid Varignon's relation and its derivative, respectively, to the angular velocities and to the accelerations measured by the inertial guidance unit and by sensors of acceleration and angular velocity placed on the robot, the last-mentioned data also being obtainable from data on the position of the robot supplied by position sensors placed on the robot. The position and attitude of the control means can then be estimated according to the previously described principle applied to the force torsors, in other words by minimizing the error, or the square of the error:

between the measurement of one of two composite acceleration and angular velocity vectors chosen from a first vector formed by the vector expressed at the control means and a second vector formed by the vector expressed at the gripping member of the robot, and the same vector reconstructed from the measurement of the other of the aforesaid two vectors, using Varignon's relation and its derivative.

Similarly, the error may also be minimized by using means similar to the means described above in relation to the force torsors.

According to this advantageous embodiment, the inertial guidance unit is used according to a method which has the advantage of requiring no integration of measurements, and which therefore does not cause drift.

The estimation algorithm and the various aforesaid steps may be employed in the controller 110 or by dedicated means.

Advantageously, the torsor of forces applied to the control means may be used to detect an intention of the operator, and to activate a command to the robot as a function of this intention, so as to constrain the trajectory of the robot. For example, an intention to perform a translational movement may be detected, and the robot may then be commanded to perform a translation, without taking into account any involuntary movements of the operator which might divert the item from its translational movement. Thus the item is moved according to virtual guides. The principle of virtual guides is permitted by a method or a system according to the present invention, and enables supplementary assistance to be given to the operator's gesture, the operator being able to specify on-line the use of this assistance, as a result of the positioning of the control means and the forces applied to them. The choice of the virtual guide may be determined as a function of the directions and senses of the forces applied by the operator to the handle, the combination of these forces, and the position in which they are applied. For example, if the operator wishes the item to rotate about the handle, he will apply only a torque about the axis about which he wishes to make the item rotate, and all the other forces will be zero. In this case, it is possible to determine that the robot must describe a circle about the axis of the applied torque, with the position of the handle at its center, the sense—or sign—of the torque giving the direction in which the circle is to be described by the robot. If virtual guides are used, the robot may be controlled by force/position control.

With reference once again to FIG. 2, and as mentioned previously with reference to FIG. 3, the handle 100 may advantageously comprise means of monitoring the control means, configured to detect the detachment of the handle 100 from the item. The means of monitoring the control means may, for example, take the form of a movable appendage mounted on a spring and positioned in the center of the base of the support 103, that is to say at the fixing means 109. The means of monitoring the control means may also simply take the form of the determination of the position of the handle: if the position of the handle 100 is determined to be at a distance greater than a specified threshold value, it may be concluded that the handle has not been kept fixed, and has slipped, for example.

Advantageously, the control means may take the form of a glove or a pair of gloves, in order to facilitate the manipulation even more for the operator.

A glove may, for example, comprise a plurality of pressure sensors, and advantageously at least one additional sensor for determining the orientation of the hand.

Also advantageously, the glove may further comprise multi-axis force sensors.

The invention claimed is:

1. A control method for a robot comprising at least one articulation and at least one gripping member adapted to move an item in space, the robot being controlled by control means, said method comprising a concatenation of at least the following steps:
    a step of positioning control means on the item,
    a step of determining the position and attitude of the control means on the basis of measurements of forces applied to the control means, defining a first force torsor, and corresponding forces at the gripping member of the robot, defining a second force torsor,
    a step of determining force or force/position control setpoints for the robot on the basis of measurements of forces on the control means applied to move the item, and of the position and attitude determined during the determination step,
    a control step in which the determined setpoints are sent to the robot.

2. The control method of claim 1, wherein the position and attitude of the control means are determined by minimizing the error between the measurement of one of two torsors chosen from said first force torsor and said second force torsor, and the measurement of the same torsor reconstructed from the measurement of the other of these two torsors, using Varignon's relation.

3. The control method of claim 2, wherein the position and attitude of the control means are determined by on-line processing of the force torsors obtained from the force measurements, using a recursive algorithm.

4. The control method of claim 3, wherein said recursive algorithm is an unscented Kalman filter.

5. The control method of claim 2, wherein the position and attitude of the control means are determined by off-line processing of the force torsors obtained from the force measurements, on the basis of a recording of the corresponding data over a specified period, using an optimization algorithm.

6. The control method of claim 5, wherein said optimization algorithm is based on the Nelder-Mead method.

7. The control method of claim 1, further comprising a step of checking the fixing of the control means to the item, which is performed after the positioning step.

8. The control method of claim 3, further comprising a location checking step which determines the consistency of the determined position and attitude of the control means by comparing a confidence level, associated with the estimated values determined by the recursive algorithm, with a predetermined level.

9. The control method of claim 5, further comprising a location checking step in which the consistency of the determined position and attitude of the control means is determined by comparing a confidence level, associated with the estimated values determined by the off-line processing, with a predetermined level.

10. The control method of claim 3, further comprising a location checking step in which the consistency of the determined position and attitude of the control means is determined by comparing the position and attitude determined in the determination step of the control means with a position and attitude of the control means determined according to an estimation or identification algorithm on the basis of at least measurements of acceleration and orientation or angular velocity of the control means made by means of appropriate sensors.

11. The control method of claim 7, wherein the step of setpoint determination is replaced by a substitute determination step in which the control setpoints of the robot are determined solely on the basis of the force and/or position measurements made at the gripping member of the robot, or at said at least one articulation of the robot, if the fixing of the control means the item is inappropriate.

12. The control method of claim 8, wherein the step of setpoint determination is replaced by a substitute determination step in which the control setpoints of the robot are determined solely on the basis of the force and/or position measurements made at the gripping member of the robot, if the determined position or attitude of the control means is inconsistent.

13. A control system for a robot comprising at least one articulation and a gripping member adapted to move an item in space, the control system comprising:
   means for measuring forces applied at the gripping member of the robot,
   control means adapted to be fixed to the item and comprising means for measuring forces applied to the control means,
   collection means configured to collect the force measurements made by the means for measuring forces applied at the gripping member of the robot and to the control means,
   a controller configured to employ the collection means, the control system being characterized in that the controller is further configured to employ a control method as claimed in claim 1.

14. The control system of claim 13, wherein the control means comprise reversible fixing means.

15. The control system of claim 13, further comprising means for monitoring the control means, configured to detect the detachment of the control means from the item, the controller being configured to employ a control method according to claim 7.

16. The control system of claim 13, wherein the control means are formed by at least one handle comprising a support and a handgrip, the support being designed to be fixed to the item by the fixing means.

17. The control system of claim 13, wherein the control means are formed by at least one glove.

* * * * *